D. G. STEPHEN.
TOW ROPE AND HITCH.
APPLICATION FILED DEC. 19, 1919.
1,375,119.
Patented Apr. 19, 1921.
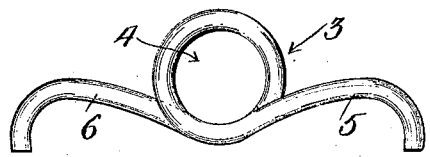
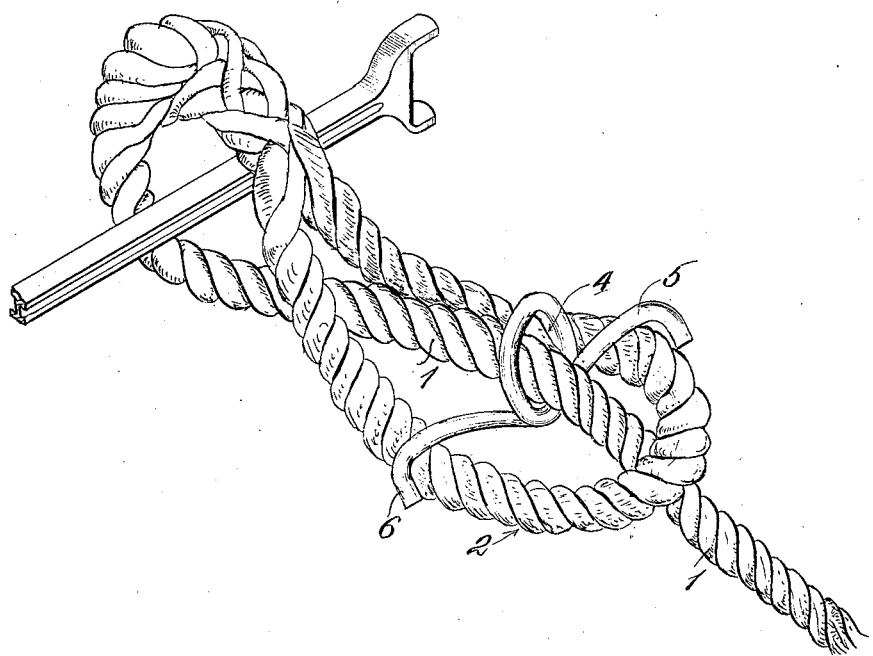
Inventor:
David G. Stephen,
by [signature]
Atty.

UNITED STATES PATENT OFFICE.

DAVID G. STEPHEN, OF MONROVIA, CALIFORNIA.

TOW-ROPE AND HITCH.

1,375,119. Specification of Letters Patent. Patented Apr. 19, 1921.

Application filed December 19, 1919. Serial No. 346,198.

*To all whom it may concern:*

Be it known that I, DAVID G. STEPHEN, a citizen of the United States, residing at Monrovia, county of Los Angeles, and State of California, have invented a certain new and useful Tow-Rope and Hitch, of which the following is a specification.

My invention relates to a tow rope and a means for enabling same to be securely, quickly and easily attached to an object or vehicle to be towed, and it has especial reference to a simple, convenient, compact and economical device by which such attachment may be made temporarily without tying or knotting the draw rope, one of the objects of the invention being to provide a contrivance that may be permanently associated with the rope and immediately brought into use upon the occasion arising.

In the accompanying drawing, I have illustrated a preferred form of embodiment of the invention, and therein—

Figure 1 is a front view, and

Fig. 2 is a perspective view showing the mode of application and use.

Generically my invention comprises a rope 1, formed on each end with an eye splice 2, in combination with an apertured body formed with oppositely extending arms, and specifically my invention may preferably comprise a bar 3 of suitable metal, coiled upon itself to form an eye or hole 4, and the respective free ends 5 and 6 thereof being extended outwardly in opposite directions and bowed downwardly, as shown.

A strand of rope 1 is passed through the eye or hole 4 of the hitch and the ends are then bent and spliced into the main strand to form an eye splice 2, which prevents dissociation or removal of the hitch therefrom. In applying the rope, the eye splice 2 is looped over a convenient part of the object to be towed, and the opposite sides of the strand forming the eye splice, placed under the downwardly bowed ends 5 and 6, the main strand of rope passing through the eye 4 and under the end of the eye splice 2.

Thus a pull on the main strand of rope will force the bowed ends 5 and 6 firmly in engagement with the side strands of the eye splice, and the end of the eye splice in engagement with the main strand 1, and such engagement will become more pronounced as the tension on the main strand increases.

What I claim, is:—

A device for attaching the eye splice of a rope to the main strand thereof, comprising a wire convolved once to form a continuous spring retaining loop, the lapping ends of the loop being so arranged that the main strand of a rope may be forced into the eye thereof, said wire having its respective ends extended in the same plane with open hooks formed at the extremities, the hooks being parallel and facing outwardly away from the loop whereby to engage the opposite sides of the eye splice and press the end thereof into engagement with the main strand of the rope.

In testimony whereof I have set my hand.

DAVID G. STEPHEN.